(12) United States Patent
Habashy et al.

(10) Patent No.: US 7,376,514 B2
(45) Date of Patent: May 20, 2008

(54) METHOD FOR DETERMINING PROPERTIES OF EARTH FORMATIONS USING DIELECTRIC PERMITTIVITY MEASUREMENTS

(75) Inventors: Tarek Habashy, Danbury, CT (US);
Nikita Seleznev, Ridgefield, CT (US);
Austin Boyd, Ridgefield, CT (US);
Mehdi Hizem, Paris (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 11/233,718

(22) Filed: Sep. 23, 2005

(65) Prior Publication Data

US 2007/0061083 A1    Mar. 15, 2007

Related U.S. Application Data

(60) Provisional application No. 60/716,254, filed on Sep. 12, 2005, provisional application No. 60/716,253, filed on Sep. 12, 2005.

(51) Int. Cl.
*G01V 3/24* (2006.01)

(52) U.S. Cl. ............................................. 702/7; 702/13

(58) Field of Classification Search .................... 702/7, 702/10, 11, 12, 13
See application file for complete search history.

(56) References Cited

U.S. PATENT DOCUMENTS

| | | | | |
|---|---|---|---|---|
| 3,849,721 A | 11/1974 | Calvert | ........................ | 324/6 |
| 3,891,916 A | 6/1975 | Meador et al. | ............. | 324/341 |
| 3,893,020 A | 7/1975 | Meador et al. | ............. | 324/341 |
| 3,893,021 A | 7/1975 | Meador et al. | ............. | 324/341 |
| 3,944,910 A | 3/1976 | Rau | ........................ | 324/338 |
| 4,626,773 A * | 12/1986 | Kroeger et al. | ............. | 324/642 |
| 4,703,277 A * | 10/1987 | Kenyon et al. | ............. | 324/323 |
| 4,704,581 A | 11/1987 | Clark | ........................ | 324/341 |
| 5,059,907 A * | 10/1991 | Sherman | ..................... | 324/323 |
| 5,243,290 A | 9/1993 | Safinya et al. | ............. | 324/338 |
| 5,345,179 A | 9/1994 | Habashy et al. | ............ | 324/338 |
| 5,434,507 A | 7/1995 | Beren et al. | ................. | 324/338 |
| 5,811,973 A | 9/1998 | Meyer, Jr. | .................... | 324/338 |
| 6,218,841 B1 | 4/2001 | Wu | ............................ | 324/338 |
| 2003/0011386 A1 * | 1/2003 | Xie et al. | .................... | 324/694 |

FOREIGN PATENT DOCUMENTS

| | | |
|---|---|---|
| EP | 0 516 525 A | 2/1992 |
| EP | 0 572 309 A | 12/1993 |
| EP | 1 693 685 A1 | 8/2006 |
| GB | 1 597 321 | 9/1981 |

(Continued)

OTHER PUBLICATIONS

Archie, G.E. "Electrical Resistivity an Aid in Core-Analysis Interpretation." *Bullet. Of Amer. Assoc. of Petroleum Geolog.* vol. 31, No. 2 (1947): pp. 350-366.

(Continued)

*Primary Examiner*—Donald E McElheny, Jr.
(74) *Attorney, Agent, or Firm*—Martin M. Novack; Jody Lynn DeStefanis; James McAleenan

(57) ABSTRACT

Techniques for estimating the fraction of water in formations being investigated use measurements of dielectric permittivity at a number of frequencies. The techniques have the advantage of minimizing or eliminating external inputs that can introduce inaccuracies.

19 Claims, 4 Drawing Sheets

FOREIGN PATENT DOCUMENTS

GB        2 322 200 A        8/1998

OTHER PUBLICATIONS

Calvert, T.J., Rau, R.N., and Wells, L.E. "Electromagnetic Propagation, A New Dimension in Logging." *SPE* 6542, 1977.

Cheruvier, E., Suau, J. "Applications of Micro-wave Dielectric Measurements in Various Logging Environments." SPWLA 27th Annual Logging Symposium. (Jun. 9-13, 1986).

Desai, K.P. and Moore, E.J. "Equivalent NaCl Determination from Ionic Concentrations." *The Log Analyst.* (May/Jun. 1969): pp. 12-21.

Klein, L.A. and Swift, C.T. "An Improved Model for the Dielectric Constant of Sea Water at Microwave Frequencies." *IEEE Trans.: On Antennas and Propagation.* vol. AP-25, No. 1, (1977): pp. 104-111.

Landau, L.D., and Lifshitz, E.M. *Electrodynamics of continuous media.* London: Pergamon, 1960: pp. 26-27.

Ramakrishnan, T.S., and Wilkinson, D.J. "Water Cut and Fractional Flow Logs from Array Induction Measurements", *SPE* paper 36503, (1996).

Seleznev, N., Boyd, A., Habashy, T., Luthi, S. "Dielectric mixing laws for fully and partially saturated carbonate rocks." Proceedings of the SPWLA 45th Annual Logging Symposium, Jun. 6-9, 2004, The Netherlands.

Taherian, M.R., Yuen, D.J., Habashy, T.M., and Kong, J. "A Coaxial-Circular Waveguide for Dielectric Measurement." *IEEE Trans. Geoscience and Remote Sensing*, vol. 29, No. 2 (Mar. 1991): pp. 321-330.

Combined Search and Examination Report dated Jan. 12, 2007 from the UK Patent Office for Application No. GB0617708.3.

Combined Search and Examination Report dated Jan. 15, 2007 from the UK Patent Office for Application No. GB0617249.8.

\* cited by examiner

METHOD FOR DETERMINING PROPERTIES OF EARTH FORMATIONS USING DIELECTRIC PERMITTIVITY MEASUREMENTS

RELATED APPLICATION

This application claims benefits of priority from the following:

i) U.S. Provisional Patent Application Ser. No. 60/716,254, entitled "TECHNIQUE FOR DETERMINING PROPERTIES OF EARTH FORMATIONS USING DIELECTRIC PERMITTIVITY MEASUREMENTS," invented by Nikita SELEZNEV, Tarek HABASHY, Austin BOYD and Mehdi HIZEM, as filed on Sep. 12, 2005.

ii) U.S. Provisional Patent Application Ser. No. 60/716,253, entitled "METHOD FOR DETERMINING PROPERTIES OF EARTH FORMATIONS USING DIELECTRIC PERMITTIVITY MEASUREMENTS," invented by Tarek HABASHY, Nikita SELEZNEV, Austin BOYD and Mehdi HIZEM, as filed on Sep. 12, 2005.

The subject matter of the present Application is related to subject matter disclosed in copending U.S. patent application Ser. No. 11/233,680, entitled "TECHNIQUE FOR DETERMINING PROPERTIES OF EARTH FORMATIONS USING DIELECTRIC PERMITTIVITY MEASUREMENTS," filed of even date herewith, and assigned to the same assignee as the present Applicant.

FIELD OF THE INVENTION

This invention relates to the field of well logging to determine characteristics of formations surrounding an earth borehole and, more particularly, to methods relating to the dielectric permittivity of earth formations.

BACKGROUND OF THE INVENTION

In order to produce hydrocarbons economically, a reasonably accurate estimation of hydrocarbon volume and movability has to be performed. The conventional resistivity interpretation method becomes unreliable if the formation water resistivity is unknown or if it is very high. Additionally, the formation factor and the cementation exponent of the formations can vary with depth, resulting in an inaccurate water saturation evaluation.

The measurement of dielectric constant (or dielectric permittivity) of formations surrounding a borehole is known to provide useful information about the formations. The dielectric constant of the different materials of earth formations vary widely (for example, roughly 2.2 for oil, 7.5 for limestone, and 80 for water), so measurement of dielectric properties can be a useful means of formation evaluation. Logging tools for this purpose have been proposed and/or developed over the years.

A logging device which measures formation dielectric constant is disclosed in the U.S. Pat. No. 3,944,910. The logging device includes a transmitter and spaced receivers mounted in a pad that is urged against the borehole wall. Microwave electromagnetic energy is transmitted into the formations, and energy which has propagated through the formations is received at the receiving antennas. The phase shift and attenuation of the energy propagating in the formations is determined from the receiver output signals. The dielectric constant and, if desired, the conductivity of the formations, can then be obtained from the phase and attenuation measurements. Measurements are typically, although not necessarily, made on the formation invaded zone. Two transmitters are generally used in a borehole compensated array to minimize the effect of borehole rugosity, tool tilt, and dissimilarities in the transmitters, receivers, and their circuits. (See, for example, U.S. Pat. No. 3,849,721.)

The antennas shown in U.S. Pat. No. 3,944,910 are slot antennas, each having a probe that extends across the slot in a direction parallel to the longitudinal direction of the borehole. This configuration has become known as a "broadside" array. The U.S. Pat. No. 4,704,581 describes a logging device of similar type, but wherein the slot antennas have probes that extend in a direction perpendicular to the longitudinal direction of the borehole. This configuration has become known as an "endfire" array. These two different configurations have orthogonal magnetic moments and some other differences. The endfire array exhibits a deeper depth of investigation and is less affected by tool standoff (e.g. from mudcake or poor pad contact) than the broadside array. On the other hand, the broadside array exhibits a stronger signal characteristic than the endfire array.

A logging device which utilizes teachings of the above-referenced U.S. Pat. Nos. 3,944,910 and 4,704,581 is the electromagnetic propagation tool ("EPT"—mark of Schlumberger). A so-called adaptable EPT ("ADEPT—mark of Schlumberger") can provide either broadside operation or endfire operation during a given logging run, depending on conditions. The ADEPT logging tool has two changeable pads, one containing a broadside antenna array and the other an endfire antenna array.

In the U.S. Pat. No. 5,434,507 there is disclosed a logging device that includes a two-dimensional array of slot antennas which can provide two-dimensional quantitative dielectric and conductivity images of formations in the region surrounding the borehole. The '507 patent states that by obtaining measurements over a two-dimensional array, and using then known log interpretation techniques, one can obtain, for example, two-dimensional maps of water-filled porosity. The tool of the '507 patent is also stated to be useful in permitting obtainment of azimuthal measurements of dielectric constant and conductivity, for example when characterizing dipping or fractured beds and other heterogeneities such as vugs or localized washouts. Reference can also be made to U.S. Pat. Nos. 5,243,290 and 5,345,179.

Dielectric logging tools, such as those described, measure effective formation permittivity and conductivity. The formations consist of the rock matrix and the pore fluids (usually hydrocarbon and water). In order to deduce the volumetric fraction of water from the effective permittivity, one has to know the relationship (the so-called mixing law) between the properties of the constituents and their mixture. Among several existing dielectric mixing laws, the CRIM (Complex Refractive Index Method) has been one of the most widely utilized formulas in the area of petrophysics (see e.g. Calvert, T. J., Rau N. R., "Electromagnetic Propagation, A New Dimension In Looging", SPE 6542, 1977.) Also, variations of CRIM were developed, such as the CTA (Complex Time Average) method (Cheruvier E., Suau J., "Application of Microwave Dielectric Measurements in Various Logging Environments", 1986, SPWLA 27th Annual Logging Symposium). Mixing laws require knowledge of the matrix and fluid complex permittivity at downhole conditions. Often it is difficult to predict these values accurately due to unknown matrix mineral composition and the resistivity of the formation water.

It is among the objects of the present invention to improve methods for estimating the volume fraction of water from dielectric logs, and to minimize, or eliminate required external inputs, hence allowing for more accurate determination of water-filled porosity. It is also among the objects of the present invention to provide a novel technique for determination of water temperature.

SUMMARY OF THE INVENTION

The present invention includes, inter alia, techniques for estimating the fraction of water in the formations being investigated, using measurements of dielectric permittivity at a number of frequencies. Embodiments of the technique have the advantage of minimizing or eliminating external inputs that heretofore may have introduced inaccuracies.

A form of the invention is directed to a method for determining the water-filled porosity of formations surrounding an earth borehole, including the following steps: deriving, from measurements of electromagnetic energy in the formations, at a first frequency, a first complex permittivity; deriving, from measurements of electromagnetic energy in the formations, at a second frequency, a second complex permittivity; and determining, as a function of said first and second complex permittivities, the water-filled porosity of the formations. Embodiments of this form of the invention include deriving, from measurements of electromagnetic energy in the formations, at a further frequency or frequencies, further complex permittivities used in the processing.

An embodiment of this form of the invention further comprises the steps of computing the permittivity of water in the formations at said first frequency, and computing the permittivity of water in the formations at said second frequency, and, in this embodiment, the step of determining the water filled porosity of the formations comprises determining said water filled porosity as a function of said first and second complex permittivities, said permittivity of water in the formations at said first frequency, and said permittivity of water in the formations at said second frequency. Also in an embodiment of this form of the invention, the temperature and the salinity of the formation water are derived, and the computed permittivity of water in the formations at said first and second frequencies are each computed as functions of said derived temperature and salinity of the formation water.

A further form of the invention is direct to a method for determining rock matrix and hydrocarbon fractional parameters of formations surrounding an earth borehole, comprising the following steps: deriving, from measurements of electromagnetic energy in the formations, at a plurality of frequencies, a plurality of complex permittivities; and deriving, as a function of said plurality of complex permittivities, a sum of rock matrix and hydrocarbon fractional parameters of said formations. In an embodiment of this form of the invention, said sum of rock matrix and hydrocarbon fractional parameters is $\phi_{hc}\sqrt{\epsilon_{hc}}+\phi_m\sqrt{\epsilon_m}$, where $\phi_{hc}$ is the hydrocarbon-filled porosity of the formations, $\phi_m$ is the rock matrix fraction of the formations, $\epsilon_{hc}$ is the permittivity of hydrocarbons in the formations, and $\epsilon_m$ is the permittivity of the rock matrix of the formations.

Another form of the invention is directed to a method for determining the temperature of water in formations surrounding a borehole, comprising the following steps: deriving, from measurements of electromagnetic energy in the formations, at a plurality of frequencies, a plurality of complex permittivities; and deriving, as a function of said plurality of complex permittivities, the temperature of water in said formations.

Further features and advantages of the invention will become more readily apparent from the following detailed description when taken in conjunction with the accompanying drawings.

DETAILED DESCRIPTION

Figure 1:
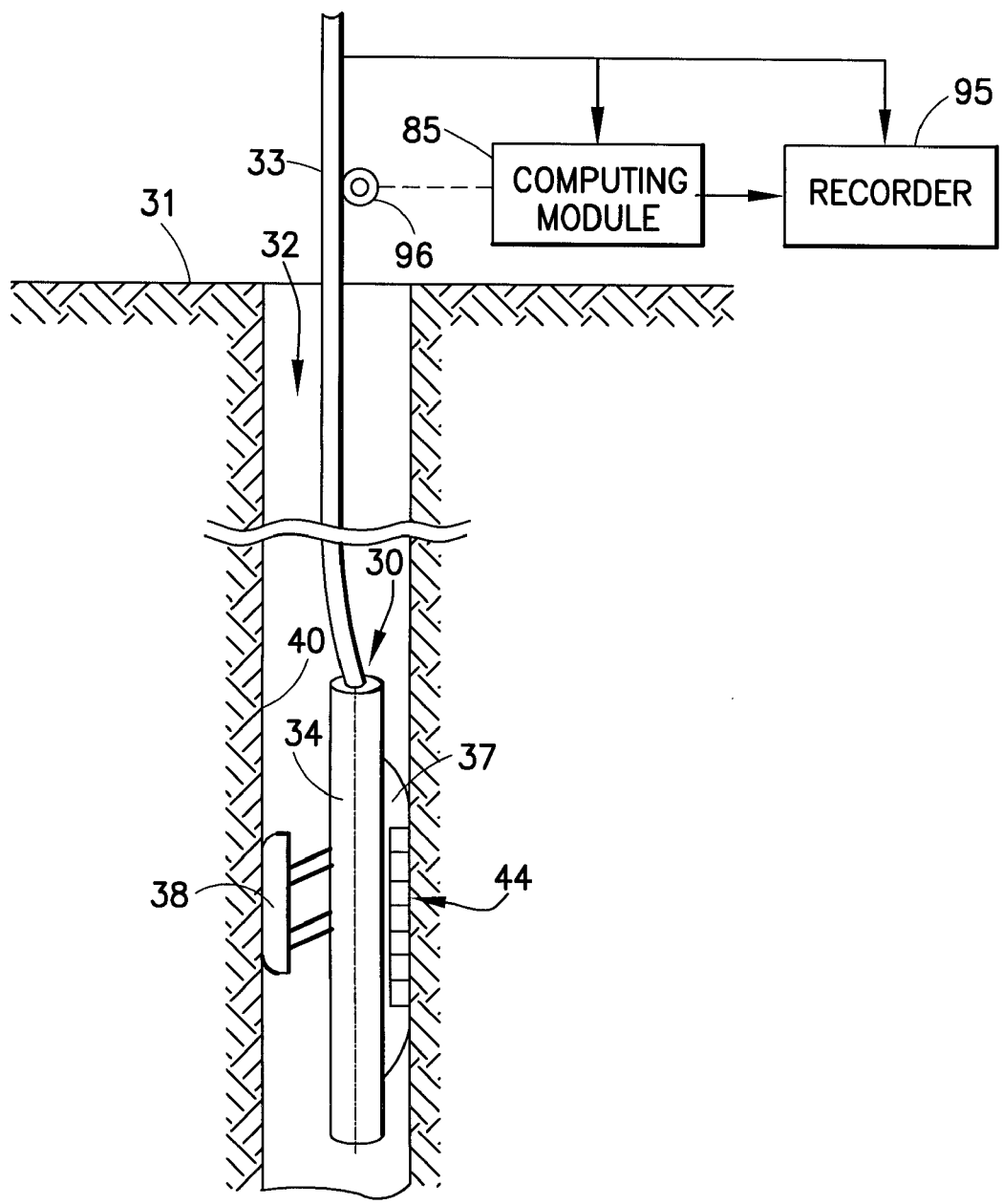
FIG. 1 is a schematic representation, partially in block diagram form, of apparatus which can be used in practicing embodiments of the invention.

Referring to FIG. 1, there is shown an apparatus 30, for investigating subsurface formations 31 traversed by a borehole 32, which can be used in practicing embodiments of the invention. The borehole 32 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 can form on the walls of the borehole.

The investigating apparatus or logging device 30 is suspended in the borehole 32 on an armored cable 33, the length of which substantially determines the relative depth of the device 30. (The invention can also have application to measurement while drilling or measurement while tripping.) The cable length is controlled by suitable means at the surface such as a drum and winch mechanism (not shown). The logging device 30 includes an elongated cylindrical sonde 34, the interior portion of which has a housing containing the bulk of the downhole electronics. Mounted on one side of sonde 34 is a pad 37 which contains an array 44 of antennas. The logging device may, for example, be of a type disclosed in U.S. Pat. No. 5,434,507, and may have features as further disclosed in U.S. Pat. Nos. 5,243,290, and 5,345,179, although other suitable devices could be used. In an embodiment as disclosed in U.S. Pat. No. 5,434,507, the antennas 44 are cross-dipole antennas. On the other side of sonde 34 is mounted a backup arm 38 which may be hydraulically controlled to maintain the pad 37 in contact with the borehole wall. The backup arm 38 can also be used to provide a caliper reading. Signals can be stored downhole by memory associated with a downhole processor, and/or some or all signals can be transmitted uphole for processing and/or storage. Electronic signals indicative of the information obtained by the logging device can be transmitted through the cable 33 to a computing module 85 and a recorder 95, located at the surface of the earth. Depth information to the recorder 95 and computing module 85 can be provided from a rotating wheel 96 that is coupled to the cable 33. The computing module 85 will typically include a processor, and associated memory, timing, input/output, display, and printing functions, none of which are separately shown. Also, it will be understood that some or all of log processing and/or interpretation processing can be performed at locations remote from the borehole.

The cross-dipole antennas, that can be utilized in practicing embodiments hereof, as in the type of logging device described in the above-referenced U.S. Pat. No. 5,434,507, can be of the type disclosed in U.S. Pat. No. 5,243,290. In the U.S. Pat. No. 5,243,290, there is disclosed a cross-dipole antenna that can be energized to produce electromagnetic energy having a magnetic dipole characteristic. An embodiment of the antenna comprises a generally square aperture in a metal body. Metal probe elements cross the aperture from different opposing sides, but are notched at their centers, so as to not touch where they cross. A dielectric material fills the rest of the aperture. Each of the probes is shorted at one end to a wall of the aperture. The other end of each probe is coupled to a conductor wire which is insulated for passage through the antenna body, and is coupled with transmitter and/or receiver circuitry, depending on the intended purpose of the antenna.

Figure 2C:
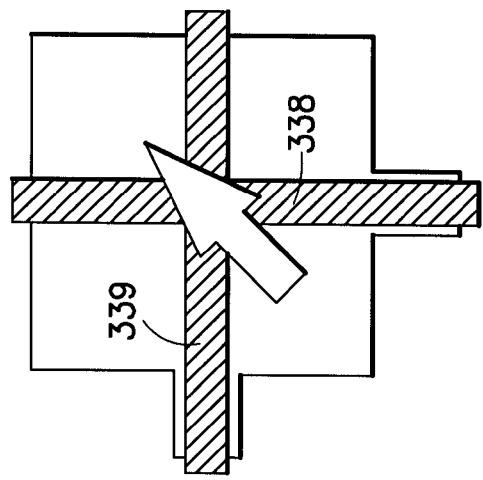
FIGS. 2A, 2B and 2C illustrate magnetic dipole moments that can be obtained with cross dipole antennas.
Figure 2B:
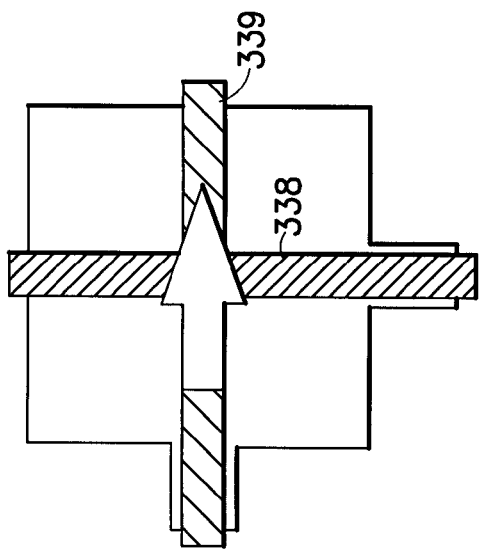
Figure 2A:
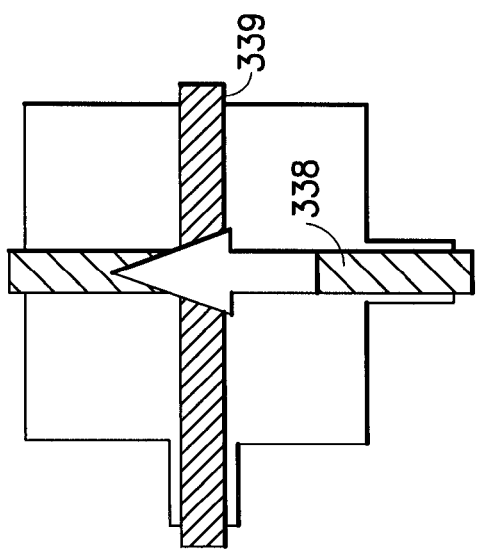

As further described in the U.S. Pat. No. 5,243,290, the cross-dipole antenna probes can be used to produce electromagnetic energy with a controlled magnetic moment direction (or angle). Referring, for example, to FIG. 2A, assume that the vertical probe element 339 is parallel to the longitudinal axis of the logging device and that the horizontal element 338 is perpendicular to said axis. Excitation of only the horizontal probe element (shown darkened) results in a vertical magnetic moment (as indicated by the arrow) and operation in an endfire mode. In the illustration of FIG. 2B, only the vertical probe element is excited, resulting in a horizontal magnetic moment and operation in a broadside mode. In FIG. 2C, both probe elements are excited by application of equal signals to the probe elements, resulting in a 45 degree magnetic moment, as shown. As further described in the referenced U.S. Pat. No. 5,243,290, application of signals of appropriate relative amplitudes and phases to the respective probe elements can produce a magnetic moment in any desired direction. Also, the antennas can be excited to operate in endfire and broadside modes either sequentially or simultaneously.

Figure 3:
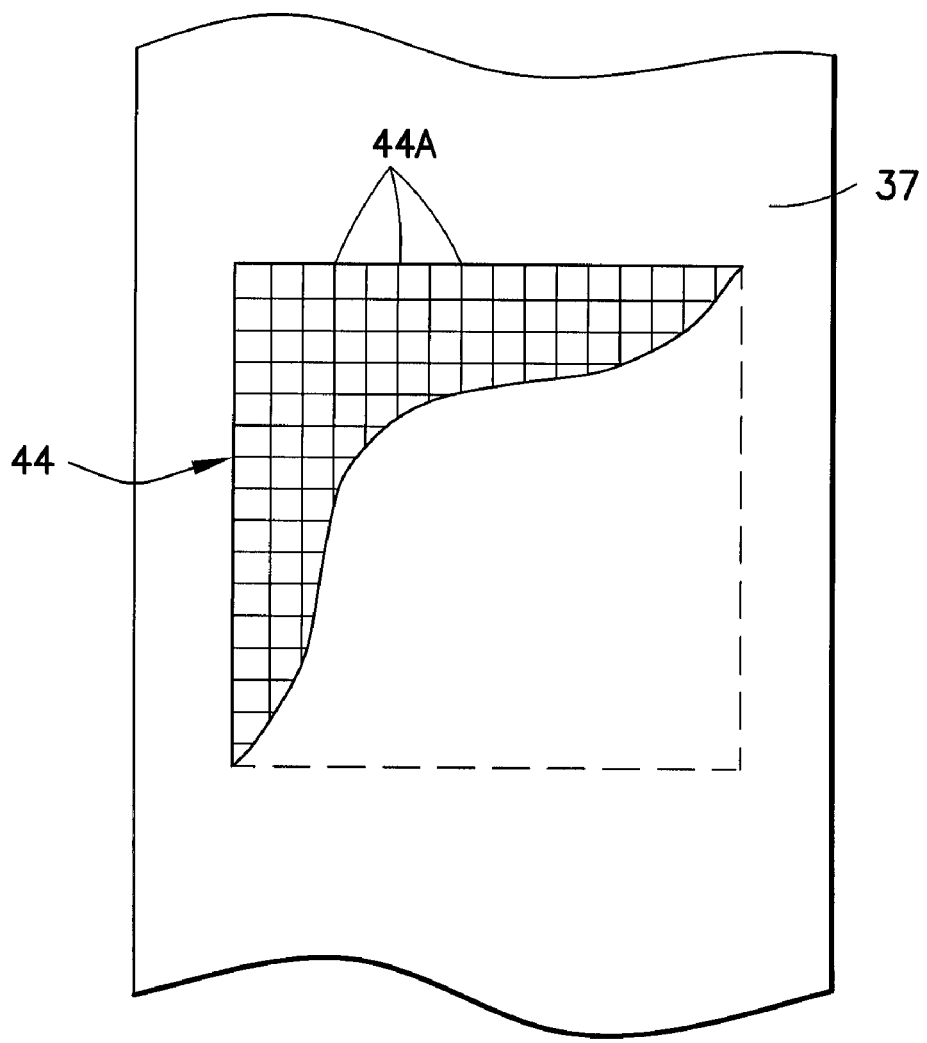
FIG. 3 is a partially broken away diagram of an antenna array that can be used in practicing embodiments of the invention.

FIG. 3 shows an example of a two-dimensional array 44 (as in FIG. 1) of cross-dipole antennas. As further described in U.S. Pat. No. 5,434,507, the antennas can be mounted in the pad 37 as a number of one-dimensional strips 44A of cross-dipole antennas, the strips being mounted side-by-side in the body of the pad. Alternatively, the individual cross-dipole antennas can be inserted as modules into a two-dimensional frame of square apertures. Each cross-dipole antenna element is addressable to be used as a transmitting antenna or a receiving antenna at a particular time under control of the processor.

An example of electronic circuitry for obtaining attenuation and phase shift measurements using the array of cross-dipole antennas, is described in detail in the referenced U.S. Pat. No. 5,434,507. (Processing to obtain permittivity and conductivity of the formations using the attenuation and phase measurements is also described in the above-referenced U.S. Pat. Nos. 3,849,721, 3,944,910, 4,704,581, 5,243,290, and 5,345,179.) By making the oscillators of such circuitry variable frequency oscillators (such as voltage controlled oscillators under control of the downhole processor), the measurements can be taken at any desired frequencies, for example frequencies in the range about 100 MHz to 1 GHz.

Effective permittivity of sedimentary rocks filled with water and hydrocarbons can often be closely approximated by the CRIM formula (also called Beer's mixing law):

$$\sqrt{\epsilon} = \phi_w \sqrt{\epsilon_w} + \phi_{hc} \sqrt{\epsilon_{hc}} + \phi_m \sqrt{\epsilon_m} \qquad (1)$$

where $\epsilon_w$, $\epsilon_{hc}$ and $\epsilon_m$ are the permittivities of water, hydrocarbon, and rock matrix, respectively, and $\phi_w$, $\phi_{hc}$ and $\phi_m$ are their corresponding fractional volumes with $\phi_w + \phi_{hc} + \phi_m = 1$. The permittivities of hydrocarbon and matrix are real and non-dispersive (i.e., constant with respect to frequency). Only the permittivity of water is in general complex due to the presence of brine and is therefore varying with frequency. Equation (1) can be written in terms of total porosity $\phi_t$ and water saturation $S_w$:

$$\sqrt{\epsilon} = \phi_t S_w \sqrt{\epsilon_w} + (1-S_w)\phi_t \sqrt{\epsilon_{hc}} + (1-\phi_t)\sqrt{\epsilon_m} \qquad (2)$$

Knowing the DC value of the water resistivity and it's temperature, one can compute the complex permittivity of water at an arbitrary frequency. One can utilize, for example, the Klein-Swift dispersion model (Klein, L., and Swift, T., "An Improved Model for The Dielectric Constant of Sea Water at Microwave Frequencies", IEEE Trans): On Antennas and Propagation, Vol. AP-25, No. 1, 104-111, 1997):

$$\epsilon_w(\omega), \sigma_w(\omega) = F(R_{DC}, T) \qquad (3)$$

The DC resistivity, $R_{DC}$, can, in turn, be related to water temperature and salinity through well-known formulae (see e.g. Desai, K. P. and Moore, E. J., "Equivalent NaCl Concentrations from Ionic Concentrations", The Log Analyst, May/June 1969):

$$R_{DC} = F(T, \text{salinity}) \qquad (4)$$

Dielectric logs are traditionally used for the evaluation of water fraction in an invaded zone. Given the effective formation permittivity $\epsilon$ at a single frequency, equations (2) and (3) can be solved simultaneously for the estimation of the water saturation $S_w$ and the formation water salinity, provided that the total porosity, temperature, and permittivity of both matrix and hydrocarbon are known.

While temperature and total porosity can usually be measured downhole by other logging tools, the hydrocarbon and matrix permittivities typically have to be assumed. In accordance with a feature of the invention, to eliminate the uncertainty in the determination of the matrix and hydrocarbon permittivities, a dielectric measurement at two different frequencies can be utilized. In this case, the water-filled porosity $\phi_w$ can be determined using the equation:

$$\phi_w = \frac{\sqrt{\varepsilon_2} - \sqrt{\varepsilon_1}}{\sqrt{\varepsilon_{w2}} - \sqrt{\varepsilon_{w1}}} \qquad (5)$$

where $\epsilon_2$ and $\epsilon_1$ are the measured rock permittivities at frequencies $f_2$ and $f_1$, respectively, and $\epsilon_{w2}$ and $\epsilon_{w1}$ are the corresponding computed complex permittivities for water. Knowing total porosity $\phi_t$ from other measurements, the water saturation can be computed as:

$$S_w = \phi_w / \phi_t \qquad (6)$$

Once the water salinity and water-filled porosity are known, one can then compute the combined value of $\phi_{hc} \sqrt{\epsilon_{hc}} + \phi_m \sqrt{\epsilon_m}$ from:

$$\phi_{hc}\sqrt{\epsilon_{hc}} + \phi_m\sqrt{\epsilon_m} = \sqrt{\epsilon} - \phi_w\sqrt{\epsilon_w} \qquad (7)$$

at any of the two frequencies ($f_1$, $f_2$). This will then allow the generation of the full dispersion curve of the formation rock from:

$$\sqrt{\epsilon} = \phi_w \sqrt{\epsilon_w} + \phi_{hc} \sqrt{\epsilon_{hc}} + \phi_m \sqrt{\epsilon_m} \qquad (8)$$

As mentioned above, this assumes the knowledge of the water temperature. In cases when it is not known, and in accordance with another feature of the invention, one can then invert for it by adding an extra dielectric measurement at a third frequency. In this case, one can first invert for the DC resistivity of water and its temperature, from the following equation:

$$\frac{\sqrt{\varepsilon_2} - \sqrt{\varepsilon_1}}{\sqrt{\varepsilon_3} - \sqrt{\varepsilon_2}} = \frac{\sqrt{\varepsilon_{w2}} - \sqrt{\varepsilon_{w1}}}{\sqrt{\varepsilon_{w3}} - \sqrt{\varepsilon_{w2}}} \qquad (9)$$

and using the Klein-Swift dispersion model (for example) to represent $\epsilon_{w3}$, $\epsilon_{w2}$ and $\epsilon_{w1}$ in terms of the DC resistivity of water and it's temperature.

Once the DC resistivity of water and its temperature are estimated, one can then compute $\epsilon_{w3}$, $\epsilon_{w2}$ and $\epsilon_{w1}$, again, from the Klein-Swift model. Finally, the water-filled porosity can be estimated from:

$$\phi_m = \frac{\sqrt{\varepsilon_2} - \sqrt{\varepsilon_1}}{\sqrt{\varepsilon_{w2}} - \sqrt{\varepsilon_{w1}}} = \frac{\sqrt{\varepsilon_3} - \sqrt{\varepsilon_2}}{\sqrt{\varepsilon_{w3}} - \sqrt{\varepsilon_{w2}}} \qquad (10)$$

The combined value of $\phi_{hc}\sqrt{\epsilon_{hc}} + \phi_m \sqrt{\epsilon_m}$ is then computed from:

$$\phi_{hc}\sqrt{\epsilon_{hc}} + \phi_m \sqrt{\epsilon_m} = \sqrt{\epsilon} - \phi_w \sqrt{\epsilon_w} \qquad (11)$$

at any of the three frequencies ($f_1$, $f_2$, $f_3$). Which will then allow the generation of the full dispersion curve from:

$$\sqrt{\epsilon} = \phi_w \sqrt{\epsilon_w} + \phi_{hc} \sqrt{\epsilon_{hc}} + \phi_m \sqrt{\epsilon_m} \qquad (12)$$

The foregoing is based on the simple Beer's mixing law. With more complicated mixing laws and their associated increased number of parameters, additional frequencies may be used.

Figure 4:
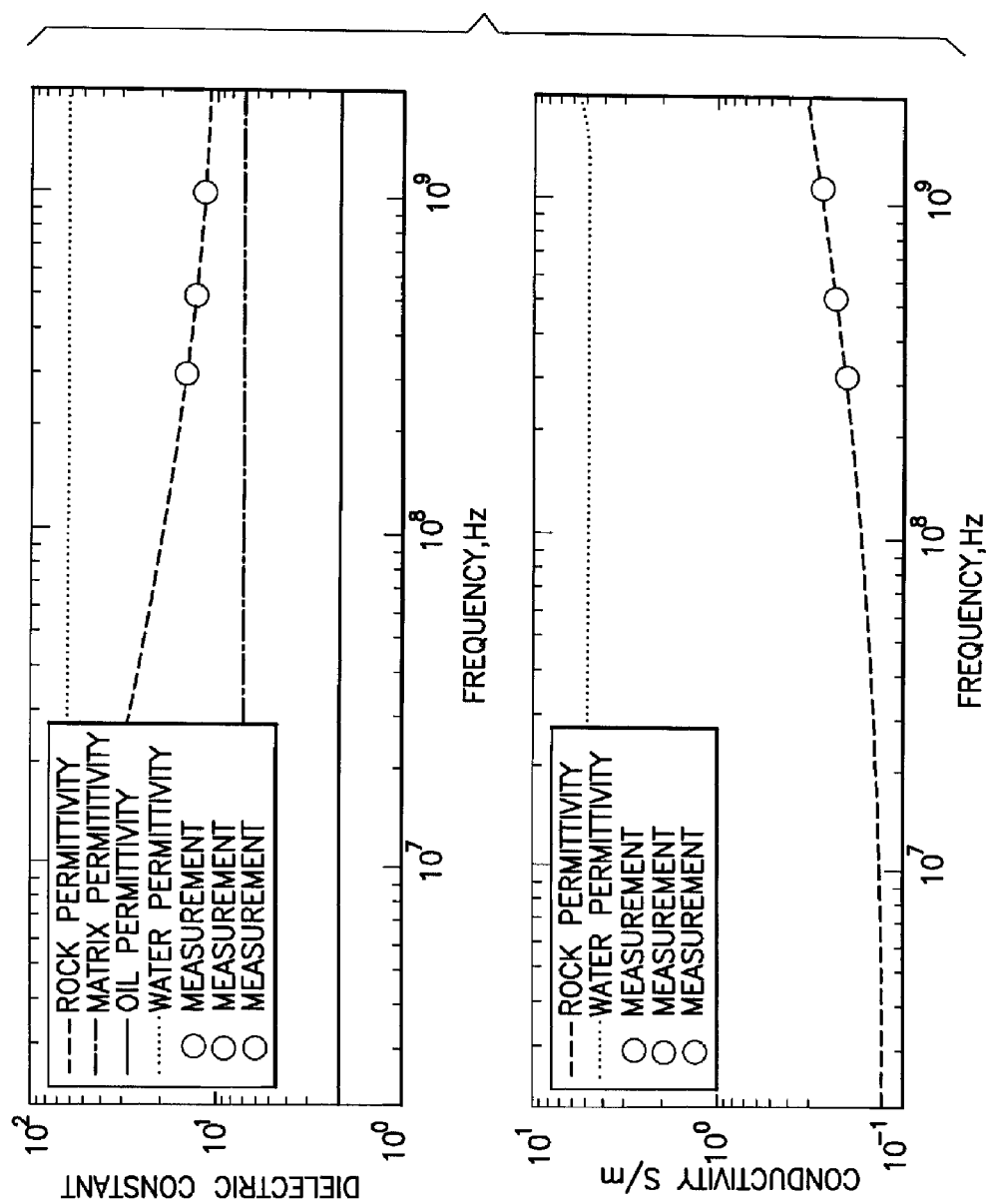
FIG. 4 show graphs of dielectric permittivity (upper graph) and conductivity (lower graph) for an example of a method in accordance with an embodiment of the invention.

As a modeled example, consider a 30 porosity unit limestone rock saturated with oil and water (So=Sw=50%). The matrix and hydrocarbon permittivities are real and equal to 7.5 and 2 correspondingly. For this example, DC water conductivity is 0.2 Ohmm and the temperature is 23 degrees C. The formation's effective permittivity (upper graph) and conductivity (lower graph) predicted by Beer's law (equation (1)) are shown in FIG. 4 as dashed lines. The water, oil and matrix permittivities are also shown. Assume, for this example, that two measurements are made with the electromagnetic propagation logging device at 1 GHz and at 500 MHz. The complex water permittivity can be computed as:

$$\varepsilon_w = \varepsilon' + \frac{\sigma_w}{i \omega \varepsilon_0} \qquad (13)$$

The effective formation permittivity can then be computed from (1). At 1 GHz one obtains $\epsilon_1 = 2.309626 - 5.004772i$. At 500 MHz, one obtains $\epsilon_2 = 13.532428 - 9.134624i$.

Equation (5) can be simultaneously solved for DC water resistivity (or water salinity) and water-filled porosity. The values of the water-filled porosity and water resistivity are adjusted until the following equalities are satisfied:

$$Re[\sqrt{\epsilon_2} - \sqrt{\epsilon_1}] = \phi_w * Re[\sqrt{\epsilon_{w2}} - \sqrt{\epsilon_{w1}}]$$

$$Im[\sqrt{\epsilon_2} - \sqrt{\epsilon_1}] = \phi_w * Im[\sqrt{\epsilon_{w2}} - \sqrt{\epsilon_{w1}}] \qquad (14)$$

The inversion methodology is described, for example, in Habashy, T., Taherian R., Yuen J., Kong J., "A Coaxial-Circular Waveguide for Dielectric Measurement", IEEE Trans. Geoscience and Remote Sensing, vol. 29, No. 2, 321-330, 1991. The initial guess was chosen as $\phi_w=0.3$ and Rw=0.1. After several iterations, the true values of $\phi_w=0.15$ and Rw=0.2 Ohmm were reconstructed. The choice of a second frequency at 500 MHz is an arbitrary one. If the second frequency is selected below 500 MHz it will make the measurement even more sensitive to the water resistivity and the water-filled porosity.

Addition of a third frequency allows for elimination of a water-filled porosity from the above equations. From equation (9) it is possible to invert for water temperature and DC resistivity. Choosing the third frequency at 300 MHz, the effective formation permittivity at 300 Mhz is $\epsilon_3 = 14.959188 - 13.723435i$. The reconstructed temperature and DC resistivity coincided with the true values ($T_w=23.00$ C, Rw=0.20 Ohmm).

The invention has been described with reference to particular preferred embodiments, but variations within the spirit and scope of the invention will occur to those skilled in the art. For example, it will be understood that while a particular mixing law (CRIM) has been used in illustrating aspects of the invention, other mixing laws, including more complex ones, could be used. If more parameters are involved, measurements at additional frequencies can be employed.

The invention claimed is:

1. A method for determining the water-filled porosity of formations surrounding an earth borehole, comprising the steps of:
   implementing measurements in said formations using electromagnetic energy at a plurality of at least three frequencies;
   deriving, from said measurements, at a first of said frequencies, a first complex permittivity;
   deriving, from said measurements, at a second of said frequencies, a second complex permittivity;
   deriving, from said measurements, at a third of said frequencies, a third complex permittivity; and
   determining, as a function of said first, second, and third complex permittivities, the water-filled porosity of the formations.

2. The method as defined by claim 1, further comprising the steps of computing the permittivity of water in the formations at said first frequency, and computing the permittivity of water in the formations at said second frequency, and computing the permittivity of water in the formations at said third frequency, and wherein said step of determining the water filled porosity of the formations comprises determining said water filled porosity as a function of said first, second, and third complex permittivities, said permittivity of water in the formations at said first frequency, and said permittivity of water in the formations at said second frequency, and said permittivity of water in the formations at said third frequency.

3. The method as defined by claim 2, further comprising the steps of deriving total porosity of the formations, and determining the water saturation of the formations from said determined water-filled porosity of the formations and said derived total porosity of the formations.

4. The method as defined by claim 2, further comprising the steps of deriving the temperature and the salinity of the formation water, and wherein said permittivity of water in the formations at said first, second, and third frequencies are each computed as functions of said derived temperature and salinity of the formation water.

5. The method as defined by claim 1, further comprising the steps of deriving total porosity of the formations, and determining the water saturation of the formations from said determined water-filled porosity of the formations and said derived total porosity of the formations.

6. The method as defined by claim 1, wherein each of said first, second, and third frequencies are greater than about 50 MHz.

7. The method comprising repeating said steps of claim 1 at different depth levels and recording a log of determined water-filled porosity of said formations.

8. A method for determining rock matrix and hydrocarbon fractional parameters of formations surrounding an earth borehole, comprising the steps of:
   implementing measurements in said formations using electromagnetic energy at a plurality of at least three frequencies;
   deriving, from measurements of electromagnetic energy in the formations, at said plurality of frequencies, a plurality of complex permittivities; and
   deriving, as a function of said plurality of complex permittivities, a sum of rock matrix and hydrocarbon fractional parameters of said formations.

9. The method as defined by claim 8, wherein said sum of rock matrix and hydrocarbon fractional parameters is $\phi_{hc}\sqrt{\epsilon_{hc}}+\phi_m\sqrt{\epsilon_m}$, where $\phi_{hc}$ is the hydrocarbon-filled porosity of the formations, $\phi_m$ is the rock matrix fraction of the formations, $\epsilon_{hc}$ is the permittivity of hydrocarbons in the formations, and $\epsilon_m$ is the permittivity of the rock matrix of the formations.

10. The method as defined by claim 9, wherein said step of deriving a sum of rock matrix and hydrocarbon fractional parameters includes determining the water-filled porosity as a function of said plurality of complex permittivities, and wherein said sum of rock matrix and hydrocarbon fractional parameters is also determined as a function of said water-filled porosity.

11. The method as defined by claim 8, wherein said step of deriving a sum of rock matrix and hydrocarbon fractional parameters includes determining the water-filled porosity as a function of said plurality of complex permittivities, and wherein said sum of rock matrix and hydrocarbon fractional parameters is also determined as a function of said water-filled porosity.

12. The method as defined by claim 1, further comprising deriving the temperature and salinity of the water in said formations, and wherein said water-filled porosity is determined also as a function of said determined temperature and salinity.

13. The method as defined by claim 8, further comprising determining the temperature of water in said formations as a function of said derived complex permittivities.

14. The method comprising repeating said steps of claim 8 at different depth levels and recording a log of the determined sum of rock matrix and hydrocarbon fractional parameters of said formations.

15. A method for determining the temperature of water in formations surrounding a borehole, comprising the steps of:
   implementing measurements in said formations using electromagnetic energy at a plurality of frequencies;
   deriving, from measurements of electromagnetic energy in the formations, at said plurality of frequencies, a plurality of complex permittivities; and
   deriving, as a function of said plurality of complex permittivities, the temperature of water in said formations.

16. The method as defined by claim 15, wherein said plurality of frequencies comprises at least three frequencies.

17. The method as defined by claim 15, further comprising the step of deriving the permittivity of the water at said plurality of frequencies, and wherein said temperature is determined also as a function of said derived permittivity of the water at said plurality of frequencies.

18. The method as defined by claim 16, further comprising the step of deriving the permittivity of the water at said plurality of frequencies, and wherein said temperature is determined also as a function of said derived permittivity of the water at said plurality of frequencies.

19. The method comprising repeating said steps of claim 15 at different depth levels and recording a log of determined temperature of water of said formations.

* * * * *